(12) United States Patent
Zarnowitz et al.

(10) Patent No.: US 11,487,318 B2
(45) Date of Patent: Nov. 1, 2022

(54) APPARATUS HAVING ANGLED SPRINGS

(71) Applicant: HEWLETT-PACKARD DEVELOPMENT COMPANY, L.P., Spring, TX (US)

(72) Inventors: Arthur Zarnowitz, Palo Alto, CA (US); Henry Chu, Palo Alto, CA (US); Victor Su, Taipei (TW); Andrew Guscott, Palo Alto, CA (US); Marcus Hoggarth, Palo Alto, CA (US); Isaac Teece, Palo Alto, CA (US); Harc Lee, Palo Alto, CA (US); Gianluca Berruti, Palo Alto, CA (US); Kang-Han Cheng, Palo Alto, CA (US); Sung-Hsuan Weng, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/481,735

(22) PCT Filed: Apr. 30, 2018

(86) PCT No.: PCT/US2018/030318
§ 371 (c)(1),
(2) Date: Jul. 29, 2019

(87) PCT Pub. No.: WO2019/212524
PCT Pub. Date: Nov. 7, 2019

(65) Prior Publication Data
US 2021/0333821 A1    Oct. 28, 2021

(51) Int. Cl.
*G06F 1/16* (2006.01)
*F16M 11/10* (2006.01)
*F16M 11/20* (2006.01)

(52) U.S. Cl.
CPC ......... *G06F 1/1601* (2013.01); *F16M 11/105* (2013.01); *F16M 11/2028* (2013.01);
(Continued)

(58) Field of Classification Search
CPC ................. G06F 1/1601; G06F 1/1637; G06F 2200/1612; G06F 2200/1614; F16M 11/105; F16M 11/2028; F16M 2200/044
See application file for complete search history.

(56) References Cited

U.S. PATENT DOCUMENTS 4,955,568 A * 9/1990 O'Connor .............. F16M 11/10
248/183.3
6,819,550 B2   11/2004 Jobs et al.
(Continued)

FOREIGN PATENT DOCUMENTS

DE   102005017487 A1 * 10/2006 ............. F16M 13/04
EP        0335206 A2 * 10/1989
(Continued)

OTHER PUBLICATIONS

North Bayou Monitor Swivel Stand sold on amazon.com, dated Jan. 14, 2016 (NB North Bayou Monitor Desk Mount Stand Full Motion Swivel Monitor Arm with Gas Spring for 17-30" Monitors) (Year: 2016).*

*Primary Examiner* — Terrell L McKinnon
*Assistant Examiner* — Ding Y Tan
(74) *Attorney, Agent, or Firm* — Brooks Cameron & Huebsch PLLC

(57) ABSTRACT

In some examples, an apparatus can include an arm, a cam connected to the arm, a first spring located around a first strut, where the first spring is oriented at a first angle relative to a base of the apparatus and the first strut is connected to the cam, a second spring located around a second strut, where the second spring is oriented at a second angle relative
(Continued)

to the base of the apparatus and the second strut is connected to the cam, where the first spring and the second spring linearly compress in response to rotation of the arm from a vertical orientation to a horizontal orientation relative to the base of the apparatus.

16 Claims, 4 Drawing Sheets

(52) U.S. Cl.
CPC ..... *G06F 1/1637* (2013.01); *F16M 2200/044* (2013.01); *G06F 2200/1612* (2013.01); *G06F 2200/1614* (2013.01)

(56) References Cited

U.S. PATENT DOCUMENTS

| | | | |
|---|---|---|---|
| 7,561,414 B2 | 7/2009 | Li et al. | |
| 7,562,851 B2* | 7/2009 | Hein | F16M 11/2014 396/421 |
| 8,047,487 B2 | 11/2011 | Hwang et al. | |
| 8,328,151 B2 | 12/2012 | Gwag | |
| 8,328,153 B2 | 12/2012 | Yang et al. | |
| 8,899,540 B2* | 12/2014 | Honsberger | E05F 1/1075 248/281.11 |
| 8,967,560 B2* | 3/2015 | Ergun | F16M 11/00 248/404 |
| 9,038,972 B2* | 5/2015 | Fu | F16M 11/10 248/133 |
| 9,237,673 B2 | 1/2016 | Tabata | |
| 9,456,511 B2 | 9/2016 | Lee et al. | |
| 9,464,752 B2 | 10/2016 | Truong et al. | |
| 2003/0086240 A1* | 5/2003 | Jobs | F16M 11/14 248/278.1 |
| 2004/0245419 A1* | 12/2004 | Sweere | F16M 11/105 248/278.1 |
| 2016/0265713 A1* | 9/2016 | Sweere | F16M 13/02 |
| 2017/0300082 A1* | 10/2017 | Park | G06F 1/1681 |

FOREIGN PATENT DOCUMENTS

| | | | | |
|---|---|---|---|---|
| EP | 1712828 B | * | 10/2006 | |
| JP | 2015032065 A | * | 2/2015 | .......... G06F 1/1637 |

* cited by examiner

APPARATUS HAVING ANGLED SPRINGS

BACKGROUND

Electronic devices may include a display. A display can present images, text, and/or video to a user. Some displays may allow a user to input information to the electronic device via the display. In such an example, the electronic device may include an apparatus to alter a viewing angle of the display. The altered viewing angle can allow a user to input information to the electronic device via the display.

DETAILED DESCRIPTION

Electronic devices such as laptops, phablets, convertibles, and other types of computing devices may include a display. An electronic device may include rotatable components to view the display at various angles. As used herein, the term "display" can, for example, refer to a device which can provide information to a user and/or receive information from a user. A display can include a graphical user interface (GUI) that can provide information to and/or receive information from a user.

A display can be rotatable to facilitate receiving information from a user. For instance, a display may be rotatable such that a user can input information to the electronic device via a stylus or other input mechanism. In some examples, a display can be rotated such that the display may be viewed at various angles.

An apparatus having angled springs can allow for rotation of a display. The apparatus can include springs oriented such that the springs counterbalance a weight of the display through a range of motion of the display. As used herein, the term "counterbalance" can, for example, refer to a force that offsets another force. As used herein, the term "range of motion" can, for example, refer to an angular distance that a moving object may travel while attached to another object. For example, the springs can counterbalance the weight of the display such that the springs provide a force that offsets the weight of the display through the angular distance the display can move to facilitate receiving information from the user.

Figure 1:
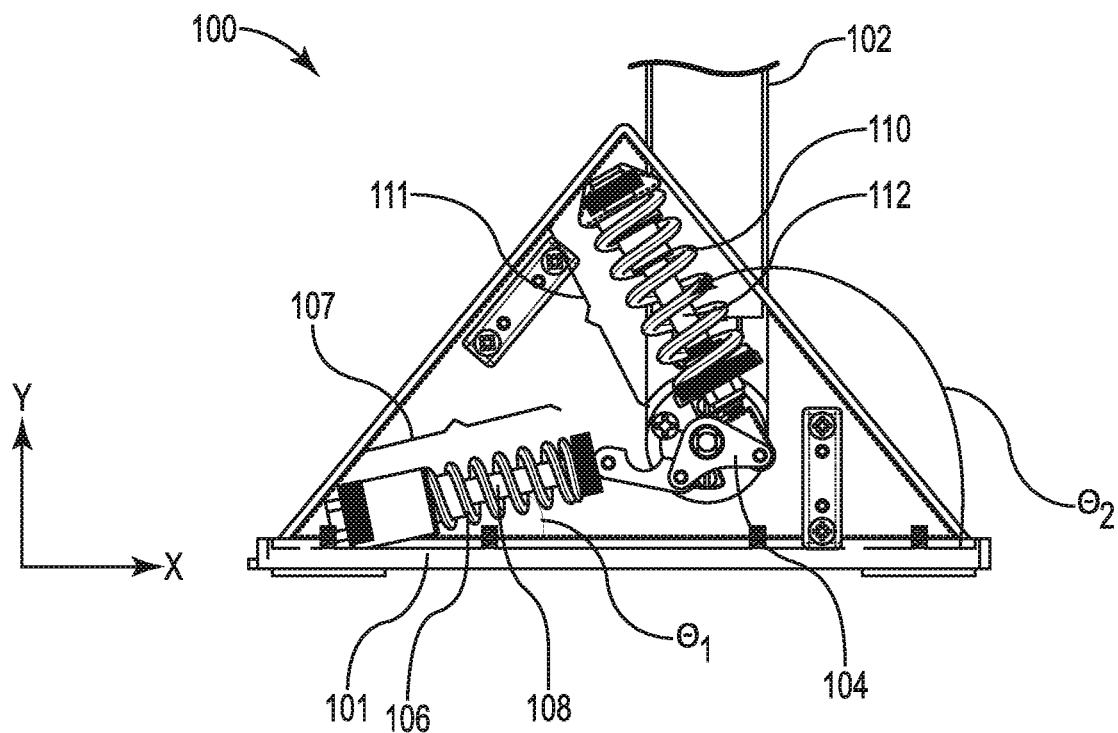
FIG. 1 illustrates an example of an apparatus having angled springs consistent with the disclosure.

FIG. 1 illustrates an example of an apparatus 100 having angled springs consistent with the disclosure. Apparatus 100 can include a base 101, arm 102, cam 104, first spring 106, first strut 108, second spring 110, and second strut 112.

As illustrated in FIG. 1, apparatus 100 can include first spring 106. As used herein, the term "spring" can, for example, refer to a mechanical device that can store mechanical energy. For example, first spring 106 can be a coil spring. For instance, first spring 106 can be a spring in the shape of a helix that can compress to store mechanical energy and decompress to release the stored mechanical energy. As used herein, the term "compress" can, for example, refer to pressing together. For example, first spring 106 can include decompressed length 107 at which first spring 106 does not store mechanical energy. For example, first spring 106 can include a decompressed length 107 of 1.5 inches, although examples of the disclosure are not so limited.

First spring 106 can compress to a different length (e.g., a compressed length, as is further described in connection with FIG. 2) at which first spring 106 stores mechanical energy, where the compressed length of first spring 106 is shorter than decompressed length 107. Further, as described above, first spring 106 can decompress from a compressed state. As used herein, the term "decompress" can, for example, refer to expanding apart. For example, first spring 106 can expand apart from the compressed length of first spring 106 to decompressed length 107 at which first spring 106 does not store mechanical energy, as is further described herein.

First spring 106 can be located around first strut 108. As used herein, the term "strut" can, for example, refer to a structural member. For example, first spring 106 can be a coil spring having a helical shape, where the coil of the spring surrounds first strut 108. In other words, first strut 108 can be located inside the helical coil of first spring 106.

First strut 108 can be connected to cam 104. As used herein, the term "cam" can, for example, refer to a rotating element in a mechanical linkage. Cam 104 can transform rotational motion into linear motion. For example, rotation of cam 104 can cause linear motion of first spring 106 and first strut 108.

As illustrated in FIG. 1, arm 102 can be connected to cam 104. As used herein, the term "arm" can, for example, refer to a structural member. Arm 102 can be connected to a display, as is further described in connection with FIGS. 3 and 4.

Apparatus 100 can include second spring 110. Second spring 110 can be a coil spring having the shape of a helix that can compress to store mechanical energy and decompress to release the stored mechanical energy. Second spring 110 can include decompressed length 111 at which second spring 110 does not store mechanical energy. For example, second spring 110 can include a decompressed length 111 of 1.5 inches, although examples of the disclosure are not so limited.

Second spring 110 can include a different length (e.g., a compressed length, as is further described in connection with FIG. 2) at which second spring 110 stores mechanical energy. Decompressed length 111 can be longer than the compressed length of second spring 110. In some examples, the decompressed lengths 107 and 111 can be different lengths. In some examples, the decompressed lengths 107 and 111 can be a same length.

Second spring 110 can be located around second strut 112. For example, second spring 110 can be a coil spring having a helical shape, where the coil of the spring surrounds second strut 112. In other words, second strut 112 can be located inside the helical coil of second spring 110.

Second strut 112 can be connected to cam 104. Cam 104 can transform rotational motion into linear motion. For example, rotation of cam 104 can cause linear motion of second spring 110 and second strut 112, as is further described herein.

First spring 106 can be oriented at a first angle (e.g., $\Theta_1$) relative to base 101 of apparatus 100. As used herein, the term "base" can, for example, refer to a bottom support of apparatus 100. First spring 106 can be oriented at the first angle $\Theta_1$ as measured relative to base 101 (e.g., counter-clockwise relative to the orientation of apparatus 100 as illustrated in FIG. 1 and from base 101). For example, the first angle $\Theta_1$ can be 28 degrees (e.g., 28°) relative to base 101. However, examples of the disclosure are not limited to 28° relative to base 101. For example, the first angle $\Theta_1$ can be more than 28° relative to base 101 or less than 28° relative to base 101. That is, the first angle $\Theta_1$ can be 30°, 35°, 40°, (e.g., any other angle between 28° and 45°) or 25°, 20°, 15°, 10°, (e.g., any other angle between 28° and 0°).

As illustrated in FIG. 1, a vertex of the first angle $\Theta_1$ can be located near a distal end of first strut 108 relative to cam 104. As used herein, the term "distal" can, for example, refer to an object situated away from a particular point relative to another point. For example, the vertex of the first angle $\Theta_1$ can be located at a point on first strut 108 away from cam 104 relative to the first compression plate (e.g., first compression plate 216, described in connection with FIG. 2).

Second spring 110 can be oriented at a second angle (e.g., $\Theta_2$) relative to base 101 of apparatus 100. Second spring 110 can be oriented at the second angle $\Theta_2$ as measured relative to base 101 (e.g., counter-clockwise relative to the orientation of apparatus 100 as illustrated in FIG. 1 and from base 101). The second angle $\Theta_2$ can be greater than the first angle $\Theta_1$ relative to base 101 of apparatus 100. For example, the second angle $\Theta_2$ can be 110° relative to base 101. However, examples of the disclosure are not limited to 110° relative to base 101. For example, the second angle $\Theta_2$ can be more than 110° relative to base 101 or less than 110° relative to base 101. That is, the second angle $\Theta_2$ can be 120°, 130°, 140°, (e.g., any other angle between 110° and 180°) or 105°, 100°, 95°, (e.g., any other angle between 110° and 90°).

As illustrated in FIG. 1, a vertex of the second angle $\Theta_2$ can be located near a proximate end of second strut 112 relative to cam 104. As used herein, the term "proximate" can, for example, refer to an object situated nearer to a particular point relative to another point. For example, the vertex of the second angle $\Theta_2$ can be located at a point on second strut 112 near cam 104 relative to the second compression plate (e.g., second compression plate 220, described in connection with FIG. 2).

As illustrated in FIG. 1, arm 102 can be in a vertical orientation. Arm 102 can rotate to a horizontal orientation, as is further described in connection with FIGS. 2 and 4. The vertical orientation of arm 102 and horizontal orientation of arm 102 can be measured relative to base 101 of apparatus 100. For example, as illustrated in FIG. 1, arm 102 can be oriented vertically, or substantially vertically, relative to base 101. As used herein, the term "substantially" intends that the characteristic does not have to be absolute, but is close enough so as to achieve the characteristic. For example, "substantially vertical" is not limited to absolute vertical. For instance, arm 102 can be within 0.5°, 1°, 2°, 5°, 10°, etc. of absolutely vertical. Further, "substantially horizontal" is not limited to absolutely horizontal. For instance, arm 102 can be within 0.5°, 1°, 2°, 5°, 10°, etc. of absolutely horizontal.

First spring 106 and second spring 110 can linearly compress in response to rotation of arm 102 from the vertical orientation (e.g., as illustrated in FIG. 1) to a horizontal orientation (e.g., as is described in connection with FIGS. 2 and 4). As used herein, the term "linear compression" can, for example, refer to pressing together in a line. For example, first spring 106 can compress in a linear direction and second spring 110 can compress in a linear direction in response to arm 102 being rotated from the vertical position to a horizontal position, as is further described in connection with FIG. 2.

Figure 2:
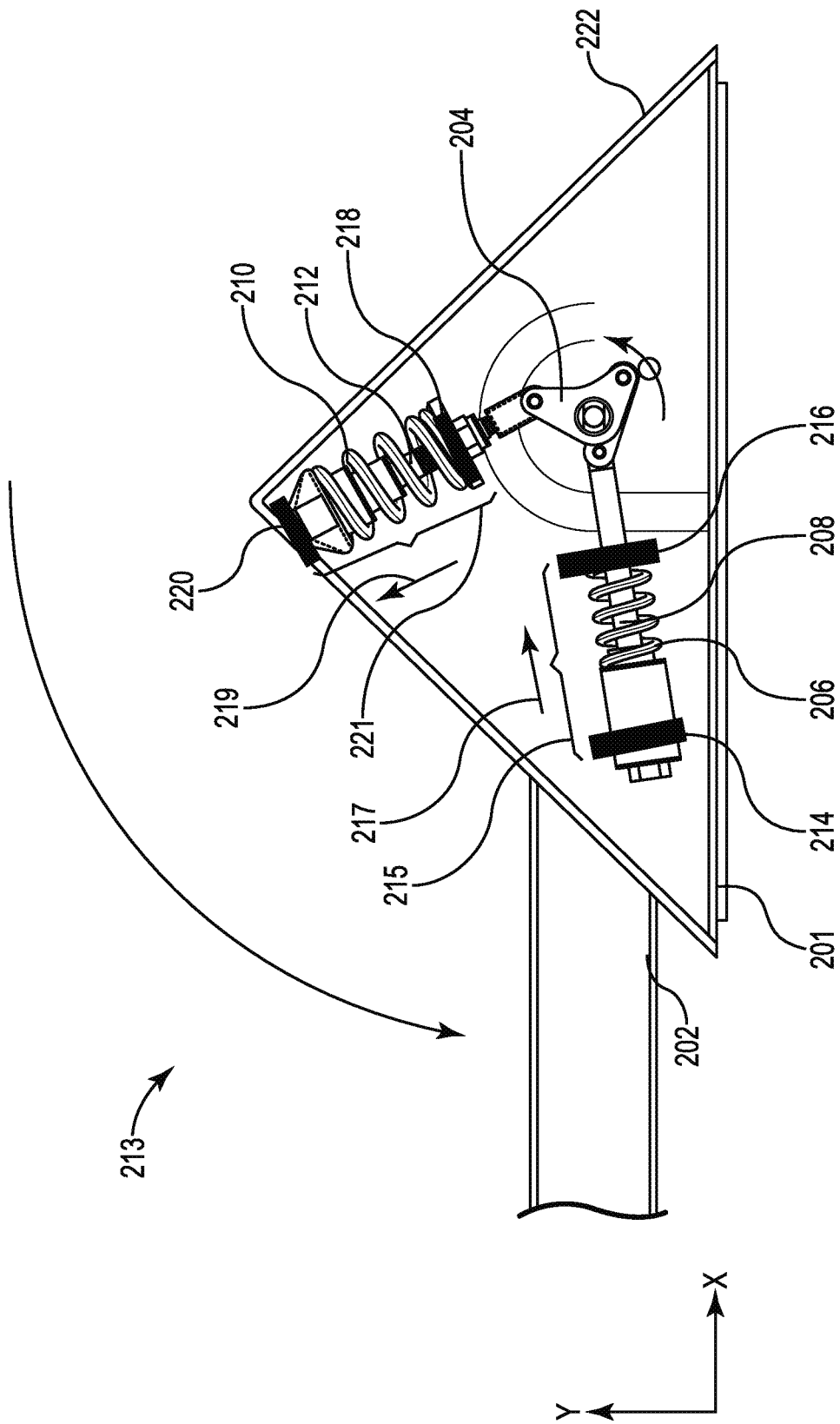
FIG. 2 illustrates an example of a system including an apparatus having angled springs consistent with the disclosure.

FIG. 2 illustrates an example of a system 213 including an apparatus having angled springs consistent with the disclosure. The system 213 can include base 201, arm 202, cam 204, first spring 206, first strut 208, first compression plate 216, second spring 210, second strut 212, and second compression plate 220. First strut 208 can include first spring seat 214. Second strut 212 can include second spring seat 218.

Similar to the apparatus described in connection with FIG. 1, system 213 can include arm 202 connected to cam 204. Cam 204 can be included in a housing 222. As used herein, the term "housing" can, for example, refer to a casing of a mechanism.

System 213 can include first spring 206 located around a first strut 208. First strut 208 can be connected to cam 204. First spring 206 and first strut 208 can be oriented at a first angle relative to base 201 of housing 222. For example, as previously described in connection with FIG. 1, first spring 206 and first strut 208 can be oriented at an angle (e.g., $\Theta_1$, as previously described in connection with FIG. 1) relative to base 201 of housing 222.

First strut 208 can include a first spring seat 214. As used herein, the term "spring seat" can, for example, refer to a support material to secure first spring 206 and to prevent first spring 206 from rotating and/or bending during compression. For example, first spring seat 214 can secure first spring 206 at the first angle (e.g., $\Theta_1$) relative to base 201 and can prevent first spring 206 from rotating (e.g., into or out of the page, as oriented in FIG. 2) or bending (e.g., clock-wise or counter-clockwise, as oriented in FIG. 2).

First spring seat 214 can be located distally from cam 204. For example, first spring seat 214 is located distally from cam 204 relative to first compression plate 216, as is further described herein.

Housing 222 can include first compression plate 216. As used herein, the term "compression plate" can, for example, refer to a rigid support material against which a spring can compress. First compression plate 216 can be fixed in housing 222 and located proximate to cam 204. For example, first compression plate 216 is located proximate to cam 204 relative to first spring seat 214. First spring 206 can compress against first compression plate 216 in response to arm 202 moving from the vertical to horizontal orientation, as is further described herein.

System 213 can include second spring 210 located around a second strut 212. Second strut 212 can be connected to cam 204. Second spring 210 and second strut 212 can be oriented at a second angle relative to base 201 of housing 222. For example, as previously described in connection with FIG. 1, second spring 210 and second strut 212 can be oriented at an angle (e.g., $\Theta_2$, as previously described in connection with FIG. 1) relative to base 201 of housing 222.

Second strut 212 can include a second spring seat 218. Second spring seat 218 can secure second spring 210 at the second angle (e.g., $\Theta_2$) relative to base 201 and can prevent second spring 210 from rotating (e.g., into or out of the page, as oriented in FIG. 2) or bending (e.g., clock-wise or counter-clockwise, as oriented in FIG. 2).

Second spring seat 218 can be located proximate to cam 204. For example, second spring seat 218 is located proximate to cam 204 relative to second compression plate 220, as is further described herein.

Housing 222 can include second compression plate 220. Second compression plate 220 can be fixed in housing 222 and located distally from cam 204. For example, second compression plate 220 is located distally from cam 204 relative to second spring seat 218. Second spring 210 can compress against second compression plate 220 in response to arm 202 moving from the vertical to horizontal orientation, as is further described herein.

As illustrated in FIG. 2, arm 202 can be in a horizontal orientation. For example, arm 202 can rotate to the horizontal orientation as illustrated in FIG. 2 from a vertical orientation (e.g., previously illustrated in FIG. 1). Arm 202 can be oriented horizontally, or substantially horizontally, relative to base 201. Arm 202 can rotate to the horizontal orientation (or substantially horizontal position) from the vertical orientation in a counter-clockwise direction, as indicated in FIG. 2.

Since arm 202 is connected to cam 204, rotation of arm 202 from a vertical orientation to a horizontal orientation can cause cam 204 to rotate. Cam 204 can rotate in a same direction as the rotation of arm 202. For instance, cam 204 can correspondingly rotate in a counter-clockwise direction in response to arm 202 rotating in a counter-clockwise direction, as indicated in FIG. 2.

Rotation of arm 202 (and correspondingly, cam 204) can cause first strut 208 to move in first linear direction 217. As first strut 208 moves in first linear direction 217, first spring seat 214 can correspondingly move in first linear direction 217. The movement of first spring seat 214 in first linear direction 217 can cause compression of first spring 206 in first linear direction 217. For example, first spring 206 can compress against the fixed first compression plate 216.

First spring 206 can be compressed in first linear direction 217 to a compressed length 215. Compressed length 215 of first spring 206 can be a shorter length than decompressed length 107 of first spring 106 (e.g., previously described in connection with FIG. 1). For example, the decompressed length 107 of first spring 106 can be 1.5 inches, and the compressed length 215 of first spring 206 can be 1 inch, although examples of the disclosure are not so limited to the above listed decompressed and compressed lengths. As oriented in FIG. 2, first spring 206 can be compressed in first linear direction 217, which corresponds to a "positive" X-direction and "positive" Y-direction, as indicated by the X-Y coordinate plane illustrated in FIG. 2.

Additionally, rotation of arm 202 (and correspondingly, cam 204) can cause second strut 212 to move in second linear direction 219. As second strut 212 moves in second linear direction 219, second spring seat 218 can correspondingly move in second linear direction 219. The movement of second spring seat 218 in second linear direction 219 can cause compression of second spring 210 in second linear direction 219. For example, second spring 210 can compress against the fixed second compression plate 220.

Second spring 210 can be compressed in second linear direction 219 to a compressed length 221. Compressed length 221 of second spring 210 can be a shorter length than decompressed length 111 of second spring 110 (e.g., previously described in connection with FIG. 1). For example, the decompressed length 111 of second spring 110 can be 1.5 inches, and the compressed length 221 of second spring 210 can be 1 inch, although examples of the disclosure are not so limited to the above listed decompressed and compressed lengths. As oriented in FIG. 2, second spring 210 can be compressed in second linear direction 219, which corresponds to a "negative" X-direction and "positive" Y-direction, as indicated by the X-Y coordinate plane illustrated in FIG. 2.

Figure 3:
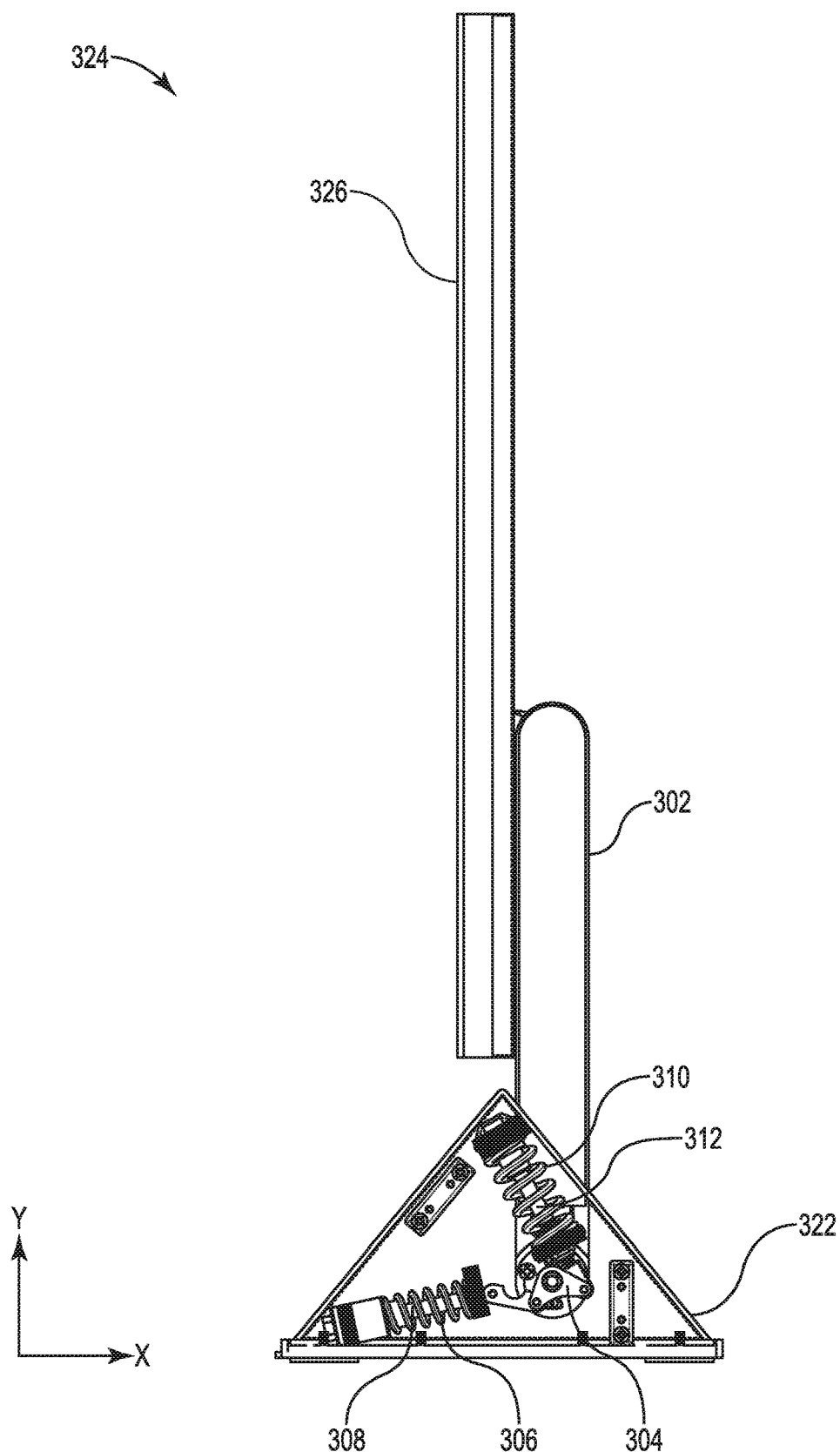
FIG. 3 illustrates an example of a computing device including an apparatus having angled springs consistent with the disclosure.

FIG. 3 illustrates an example of a computing device 324 including an apparatus having angled springs consistent with the disclosure. The computing device 324 can include display 326, arm 302, and housing 322. Housing 322 can include first spring 306, first strut 308, second spring 310, and second strut 312.

Similar to the apparatus and system described in connection with FIGS. 1 and 2, respectively, computing device 324 can include arm 302. Arm 302 can be connected to cam 304 located in housing 322. Display 326 can be connected to arm 302.

Housing 322 can include cam 304. Cam 304 can be connected to first strut 308. First spring 306 can be located around first strut 308. First spring 306 and first strut 308 can be oriented at a first angle relative to a base of housing 322. For example, as previously described in connection with FIG. 1, first spring 306 and first strut 308 can be oriented at an angle (e.g., $\Theta_1$, as previously described in connection with FIG. 1) relative to the base of housing 322.

Housing 322 can include second spring 310 located around second strut 312. Second strut 312 can be connected to cam 304. Second spring 310 and second strut 312 can be oriented at a second angle relative to the base of housing 322. For example, as previously described in connection with FIG. 1, second spring 310 and second strut 312 can be oriented at an angle (e.g., $\Theta_2$, as previously described in connection with FIG. 1) relative to the base of housing 322.

As illustrated in FIG. 3, arm 302 is oriented in a vertical orientation. In the vertical orientation, display 326 can display information to a user of computing device 324. Arm 302 can rotate from the vertical orientation to a horizontal orientation, causing cam 304 to rotate. Rotation of cam 304 can cause first strut 308 to move in a first linear direction to compress first spring 306 in the first linear direction, and can cause second strut 312 to move in a second linear direction to compress second spring 310 in the second linear direction. First spring 306 and second spring 310 can counterbalance the weight of display 326 through a range of motion of arm 302, as is further described in connection with FIG. 4.

Figure 4:
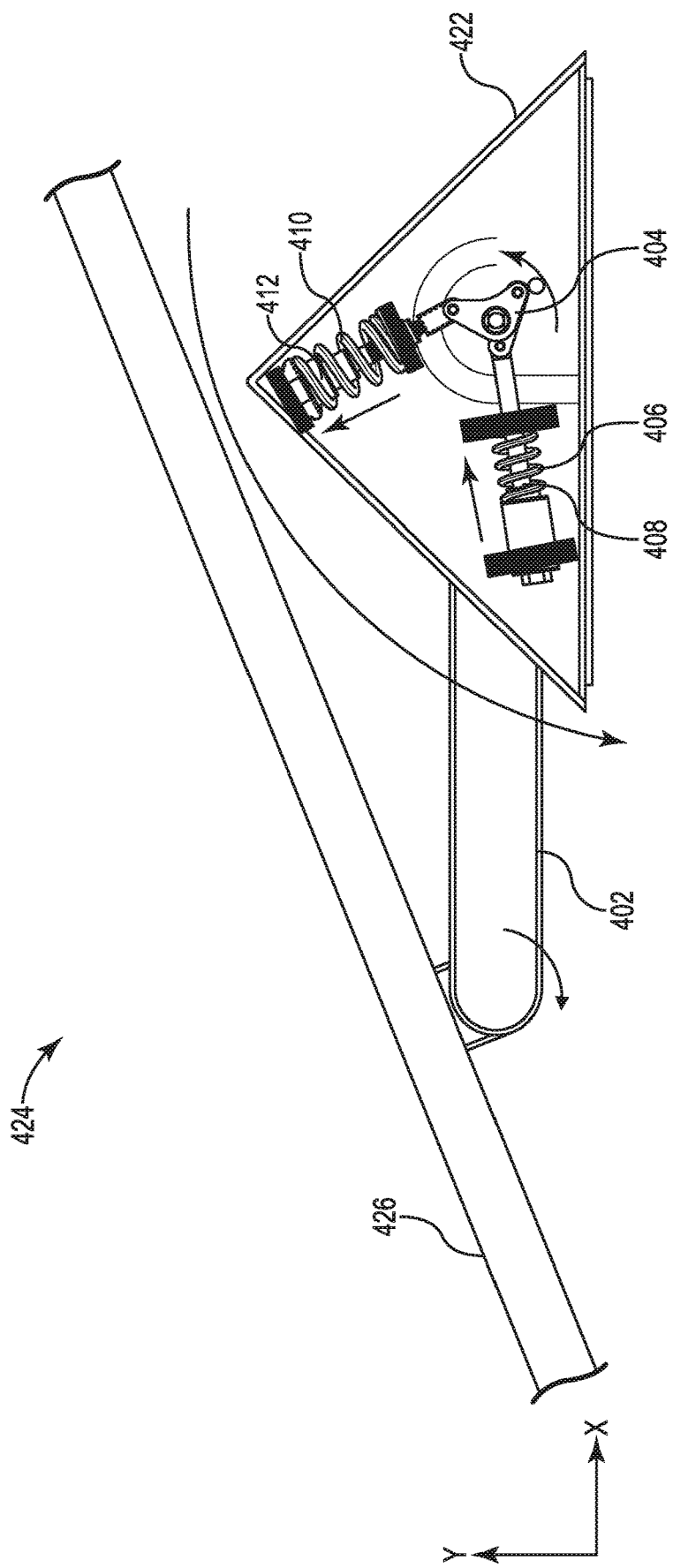
FIG. 4 illustrates an example of a computing device including an apparatus having angled springs consistent with the disclosure.

FIG. 4 illustrates an example of a computing device 424 including an apparatus having angled springs consistent with the disclosure. The computing device 424 can include display 426, arm 402, and housing 422. Housing 422 can include first spring 406, first strut 408, second spring 410, and second strut 412.

As illustrated in FIG. 4, arm 402 can rotate from the vertical orientation (e.g., as illustrated in FIG. 3) to the horizontal orientation. As indicated in FIG. 4, arm 402 can rotate in a counter-clockwise direction to the horizontal orientation.

Rotation of arm 402 can cause rotation of cam 404 in the counter-clockwise direction. Rotation of cam 404 can cause first strut 408 to move in a first linear direction, as indicated in FIG. 4. Movement of the first strut 408 in the first linear direction can cause first spring 406 to compress in the first linear direction. First spring 406 can compress into a first compression plate, as previously described in connection with FIG. 2.

Additionally, rotation of arm 402 (and correspondingly, cam 404) can cause second strut 412 to move in a second linear direction, as indicated in FIG. 4. Movement of second strut 412 in the second linear direction can cause second spring 410 to compress in the second linear direction. Second spring 410 can compress into a second compression plate, as previously described in connection with FIG. 2.

Based on the angle of first spring 406 relative to the base of housing 422 (e.g., $\Theta_1$, as previously described in connection with FIG. 1) and the angle of second spring 410 relative to the base of housing 422 (e.g., $\Theta_2$, as previously described in connection with FIG. 1), compression of first spring 406 and second spring 410 can counterbalance the weight of display 426. For example, as arm 402 moves through its range of motion (e.g., from the vertical orientation to the horizontal orientation and vice versa), the weight of display 426 can be counterbalanced by first spring 406 and second spring 410 based on the relative angled orientations of first spring 406 and second spring 410.

In some examples, arm 402 can include a range of motion of 90° (measured from the vertical to the horizontal orientation of arm 402). As arm 402 rotates from the vertical orientation (e.g., 0°) to the horizontal orientation (e.g., 90°), second spring 410 can be compressed while first spring 406 remains decompressed. As arm 402 reaches a particular orientation (e.g., 70° measured from the vertical orientation), first spring 406 can begin to be compressed. As arm 402 rotates from 70° to the horizontal orientation (e.g., 90°), first spring 406 and second spring 410 can both be compressed.

Although the particular orientation is described above as being 70°, examples of the disclosure are not so limited. For example, the particular orientation at which first spring 406 begins to be compressed can be less than 70° or more than 70°.

As illustrated in FIG. 4, arm 402 is oriented in a horizontal orientation. In the horizontal orientation, display 426 can be rotated to display information to a user of computing device 424. In some examples, display 426 can be oriented as illustrated in FIG. 4 to allow for a user to input information to computing device 424 via display 426. For example, display 426 can be oriented such that a user can input information via a touch-screen GUI of display 426 utilizing a stylus or other input mechanism. The orientation of display 426 can allow for easier input via the stylus as compared to the orientation of the display as illustrated in FIG. 3.

Arm 402 can be rotated from the horizontal orientation (e.g., as illustrated in FIG. 4) back to the vertical orientation (e.g., as illustrated in FIG. 3). For example, arm 402 can be rotated clockwise, as oriented in FIG. 4, from the horizontal orientation to the vertical orientation.

Rotation of arm 402 from the horizontal orientation to the vertical orientation can correspondingly cause cam 404 to rotate in a clockwise direction. Rotation of cam 404 in a clockwise direction can decompress first spring 406 and second spring 410. For example, first strut 408 can move in a "negative" X-direction and a "negative" Y-direction, causing first spring 406 to move in the same direction, decompressing first spring 406. Additionally, second strut 412 can move in a "positive" X-direction and a "negative" Y-direction, causing second spring 410 to move in the same direction, decompressing second spring 410.

In the example in which second spring 410 is compressed before first spring 406 when arm 402 is rotated through the particular orientation in the range of motion of arm 402, first spring 406 can decompress until arm 402 reaches the particular orientation (e.g., 70° measured from the vertical orientation). When arm 402 is at the 70° orientation as arm 402 is moving clockwise (e.g., towards the vertical orientation), first spring 406 can be fully decompressed, while second spring 410 decompresses through the remaining range of motion of arm 402 as arm 402 is moved clockwise to the vertical orientation.

An apparatus having angled springs can allow for rotation of rotatable components of a display. The display can be oriented such that a user can view the display from different angles. The display can then be viewed at the different angles, and can display and/or receive information at the different angles, which may be convenient for a user of the computing device.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure. Further, as used herein, "a" can refer to one such thing or more than one such thing.

The figures herein follow a numbering convention in which the first digit corresponds to the drawing figure number and the remaining digits identify an element or component in the drawing. For example, reference numeral 102 may refer to element 102 in FIG. 1 and an analogous element may be identified by reference numeral 202 in FIG. 2. Elements shown in the various figures herein can be added, exchanged, and/or eliminated to provide additional examples of the disclosure. In addition, the proportion and the relative scale of the elements provided in the figures are intended to illustrate the examples of the disclosure, and should not be taken in a limiting sense.

It can be understood that when an element is referred to as being "on," "connected to" "coupled to", or "coupled with" another element, it can be directly on, connected, or coupled with the other element or intervening elements may be present. In contrast, when an object is "directly coupled to" or "directly coupled with" another element it is understood that are no intervening elements (adhesives, screws, other elements) etc.

The above specification, examples and data provide a description of the method and applications, and use of the system and method of the disclosure. Since many examples can be made without departing from the spirit and scope of the system and method of the disclosure, this specification merely sets forth some of the many possible example configurations and implementations.

What is claimed is:

1. An apparatus, comprising:
    a housing, including:
        an arm;
        a cam connected to the arm;
        a first spring located around a first strut, wherein:
            the first spring is oriented at a first angle relative to a base of the apparatus by a first spring seat of the first strut;
            the first strut is connected to the cam; and
            a distal end of the first strut is oriented towards the base;
        a first compression plate fixed to the housing and located proximate to the cam relative to the first spring seat;
        a second spring located around a second strut, wherein:
            the second spring is oriented at a second angle relative to the base of the apparatus by a second spring seat of the second strut;
            the second strut is connected to the cam; and
            a distal end of the second strut is oriented away from the base;
        a second compression plate fixed to the housing and located distally from the cam relative to the second spring seat;

wherein the first spring linearly compresses in a direction towards the cam against the first compression plate and the second spring linearly compresses in a direction away from the cam against the second compression plate in response to rotation of the arm from a vertical orientation to a horizontal orientation relative to the base of the apparatus.

2. The apparatus of claim 1, wherein the second angle is greater than the first angle relative to the base of the apparatus.

3. The apparatus of claim 1, wherein:
the rotation of the arm from the vertical orientation to the horizontal orientation causes the cam to rotate; and
the rotation of the cam causes the first spring to linearly compress.

4. The apparatus of claim 3, wherein the first strut is moved in a linear direction corresponding to a direction of the linear compression of the first spring in response to the rotation of the cam.

5. The apparatus of claim 1, wherein:
the rotation of the arm from the vertical orientation to the horizontal orientation causes the cam to rotate; and
the rotation of the cam causes the second spring to linearly compress.

6. The apparatus of claim 5, wherein the second strut is moved in a linear direction corresponding to a direction of the linear compression of the second spring in response to the rotation of the cam.

7. A system, comprising:
an arm; and
a housing, including:
a cam connected to the arm;
a first spring located around a first strut, wherein:
the first strut is connected to the cam and the first spring and the first strut are oriented at a first angle relative to a base of the housing by a first spring seat; and
a distal end of the first strut is oriented towards the base;
a first compression plate fixed to the housing and located proximate to the cam relative to the first spring seat;
a second spring located around a second strut, wherein:
the second strut is connected to the cam and the second spring and the second strut are oriented at a second angle relative to the base of the housing by a second spring seat; and
a distal end of the second strut is oriented away from the base; and
a second compression plate fixed to the housing and located distally from the cam relative to the second spring seat;
wherein the arm rotates from a vertical orientation to a horizontal orientation such that the cam rotates causing:
the first strut to move in a first linear direction to compress the first spring in the first linear direction towards the cam against the first compression plate; and
the second strut to move in a second linear direction to compress the second spring in the second linear direction away from the cam against the second compression plate.

8. The system of claim 7, wherein the cam and the arm rotate in a same direction in response to the arm rotating from the vertical orientation to the horizontal orientation.

9. A computing device, comprising:
an arm;
a display connected to the arm; and
a housing, including:
a cam connected to the arm;
a first spring located around a first strut, wherein:
the first strut is connected to the cam and the first spring and the first strut are oriented at a first angle relative to a base of the housing by a first spring seat; and
a distal end of the first strut is oriented towards the base;
a first compression plate fixed to the housing and located proximate to the cam relative to the first spring seat;
a second spring located around a second strut, wherein:
the second strut is connected to the cam and the second spring and the second strut are oriented at a second angle relative to the base of the housing by a second spring seat; and
a distal end of the second strut is oriented away from the base; and
a second compression plate fixed to the housing and located distally from the cam relative to the second spring seat;
wherein the arm rotates from a vertical orientation to a horizontal orientation such that the cam rotates causing:
the first strut to move in a first linear direction to compress the first spring in the first linear direction towards the cam against the first compression plate; and
the second strut to move in a second linear direction to compress the second spring in the second linear direction away from the cam against the second compression plate.

10. The computing device of claim 9, wherein compressing the first spring and the second spring counterbalances a weight of the display of the computing device through a range of motion during rotation of the arm from the vertical orientation to the horizontal orientation.

11. The computing device of claim 10, wherein:
the second spring is compressed as the arm rotates from the vertical orientation to a particular orientation in the range of motion of the arm; and
in response to the arm reaching the particular orientation in the range of motion, the first spring is compressed as the arm rotates from the particular point in the range of motion to the horizontal orientation.

12. The computing device of claim 9, wherein the arm rotates from the horizontal orientation to the vertical orientation to decompress the first spring and the second spring, wherein decompressing the first spring and the second spring counterbalances a weight of the display of the computing device through a range of motion during rotation of the arm from the horizontal orientation to the vertical orientation.

13. The apparatus of claim 1, wherein the housing is a triangular housing.

14. The apparatus of claim 13, wherein the distal end of the first strut is located in a first corner of the triangular housing.

15. The apparatus of claim 14, wherein the distal end of the second strut is located in a second corner of the triangular housing, wherein the second corner is different from the first corner.

16. The apparatus of claim 1, wherein the first spring and the second spring are oriented at an included angle of greater than thirty degrees but less than ninety degrees relative to each other.

* * * * *